US011872427B2

(12) United States Patent
Polan

(10) Patent No.: US 11,872,427 B2
(45) Date of Patent: *Jan. 16, 2024

(54) FLEXIBLE DRY SPRINKLER

(71) Applicant: The Reliable Automatic Sprinkler Co. Inc., Liberty, SC (US)

(72) Inventor: George S. Polan, Liberty, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,042

(22) Filed: Feb. 8, 2023

(65) Prior Publication Data

US 2023/0181953 A1 Jun. 15, 2023

Related U.S. Application Data

(63) Continuation of application No. 17/149,178, filed on Jan. 14, 2021, now Pat. No. 11,596,822, which is a (Continued)

(51) Int. Cl.

*A62C 35/62* (2006.01)
*A62C 35/58* (2006.01)

(Continued)

(52) U.S. Cl.

CPC .............. *A62C 35/62* (2013.01); *A62C 31/02* (2013.01); *A62C 31/28* (2013.01); *A62C 33/04* (2013.01);

(Continued)

(58) Field of Classification Search

CPC ......... A62C 31/02; A62C 31/28; A62C 33/04; A62C 35/58; A62C 35/32; A62C 37/14; A62C 35/62; A62C 37/42

(Continued)

(56) References Cited

U.S. PATENT DOCUMENTS 3,007,528 A 7/1959 Gloeckler
3,135,331 A * 6/1964 Lee ...................... A62C 35/605 169/17

(Continued)

FOREIGN PATENT DOCUMENTS

CA 2837316 A1 12/2012
CN 101291706 A 10/2008

(Continued)

OTHER PUBLICATIONS

International Preliminary Report on Patentability dated Dec. 2, 2014, issued in corresponding International Patent Application No. PCT/US2013/043298.

(Continued)

*Primary Examiner* — Steven J Ganey
(74) *Attorney, Agent, or Firm* — Venable LLP

(57) ABSTRACT

A flexible dry sprinkler has an inlet having an inlet orifice, an outlet, a flexible tube having a first end attached to the inlet and a second end attached to the outlet, an inlet seal for sealing the inlet orifice, whereby, when the inlet seal releases, fluid is permitted to flow from the inlet orifice to the outlet through the flexible tube, and a yoke positioned in the inlet, the yoke having a plurality of spaced-apart legs that permit the fluid to flow passed the yoke toward the outlet.

20 Claims, 5 Drawing Sheets

Related U.S. Application Data continuation of application No. 16/515,600, filed on Jul. 18, 2019, now Pat. No. 10,933,267, which is a continuation of application No. 16/044,837, filed on Jul. 25, 2018, now Pat. No. 10,493,307, which is a continuation of application No. 14/534,881, filed on Nov. 6, 2014, now Pat. No. 10,265,560, which is a continuation of application No. 13/486,904, filed on Jun. 1, 2012, now Pat. No. 8,887,822.

(51) Int. Cl.

| | |
|---|---|
| ***A62C 31/28*** | (2006.01) |
| ***A62C 33/04*** | (2006.01) |
| ***A62C 31/02*** | (2006.01) |
| ***A62C 37/14*** | (2006.01) |
| ***A62C 37/42*** | (2006.01) |

(52) U.S. Cl.

CPC .............. *A62C 35/58* (2013.01); *A62C 37/14* (2013.01); *A62C 37/42* (2013.01)

(58) Field of Classification Search

USPC ........ 169/16, 17, 19, 20, 37, 38, 42, 54, 56, 169/57; 239/208, 209, 588; 52/39, 52/506.07; 248/56, 75, 343; 285/45, 285/114, 116

See application file for complete search history.

(56) References Cited

U.S. PATENT DOCUMENTS

| | | | |
|---|---|---|---|
| 3,857,277 | A | 12/1974 | Moore |
| 4,177,862 | A | 12/1979 | Bray |
| 4,217,961 | A | 8/1980 | Wotton |
| 4,570,719 | A | 2/1986 | Wilk |
| 4,854,388 | A | 8/1989 | Wyatt |
| 4,930,579 | A | 6/1990 | George |
| 4,964,470 | A | 10/1990 | Gaulin |
| 4,991,655 | A | 2/1991 | McHugh |
| 5,154,232 | A | 10/1992 | McHugh |
| 5,297,635 | A | 3/1994 | McHugh |
| 5,327,976 | A | 7/1994 | Hattori |
| 5,390,744 | A | 2/1995 | McHugh |
| 5,415,239 | A | 5/1995 | Kotter et al. |
| 5,570,745 | A | 11/1996 | MacDonald, III |
| 5,743,337 | A | 4/1998 | MacDonald, III |
| 5,775,431 | A | 7/1998 | Ondracek |
| 5,842,526 | A | 12/1998 | Archer et al. |
| 5,967,240 | A | 10/1999 | Ondracek |
| 6,119,784 | A | 9/2000 | MacDonald, III et al. |
| 6,123,154 | A | 9/2000 | MacDonald, III et al. |
| 6,158,519 | A | 12/2000 | Kretschmer |
| 6,164,324 | A | 12/2000 | Gradle |
| 6,336,509 | B1 | 1/2002 | Polan et al. |
| 6,488,097 | B1 | 12/2002 | MacDonald, III et al. |
| 6,491,109 | B2 | 12/2002 | Christenson et al. |
| 6,526,907 | B1 | 3/2003 | Donehue |
| 6,752,218 | B2 | 6/2004 | MacDonald, III et al. |
| 6,851,482 | B2 | 2/2005 | Dolan |
| 6,860,331 | B2 | 3/2005 | Hagen et al. |
| 6,871,660 | B2 | 3/2005 | Hampsch |
| 6,907,938 | B2 | 6/2005 | MacDonald, III et al. |
| 6,960,638 | B2 | 11/2005 | Quis et al. |
| 7,032,680 | B2 | 4/2006 | MacDonald, III et al. |
| 7,143,834 | B2 | 12/2006 | Dolan |
| 7,213,319 | B2 | 5/2007 | Silva, Jr. et al. |
| 7,293,576 | B2 | 11/2007 | Royse |
| 7,296,634 | B2 | 11/2007 | MacDonald, III et al. |
| 7,373,720 | B1 | 5/2008 | Jensen et al. |
| 7,516,800 | B1 | 4/2009 | Silva, Jr. et al. |
| 7,559,376 | B2 | 7/2009 | Silva, Jr. |
| 7,699,117 | B2 | 4/2010 | Johnston et al. |
| 7,766,252 | B2 | 8/2010 | Jackson et al. |
| 7,841,418 | B2 | 11/2010 | Pahila et al. |
| 7,845,599 | B2 | 12/2010 | Jackson |
| 7,921,928 | B2 | 4/2011 | Thompson et al. |
| 8,191,647 | B2 | 6/2012 | Cordell et al. |
| 8,212,615 | B2 | 9/2012 | Silcox et al. |
| 8,336,920 | B2 | 12/2012 | Stempo et al. |
| 8,607,888 | B2 | 12/2013 | Nusbaum |
| 8,740,158 | B2 | 6/2014 | Silcox |
| 8,887,822 | B2 | 11/2014 | Polan |
| 9,159,598 | B2 | 10/2015 | Yamamoto et al. |
| 9,339,673 | B2 | 5/2016 | Shipman |
| 9,358,411 | B2 * | 6/2016 | Shipman ................ A62C 35/68 |
| 10,143,872 | B2 | 12/2018 | Shipman |
| 10,265,560 | B2 | 4/2019 | Polan |
| 10,391,343 | B2 | 8/2019 | Polan |
| 10,493,307 | B2 | 12/2019 | Polan |
| 2002/0003042 | A1 * | 1/2002 | Reilly .................... A62C 35/62 169/17 |
| 2003/0075343 | A1 | 4/2003 | Ballard |
| 2005/0090604 | A1 | 4/2005 | Quis et al. |
| 2005/0121206 | A1 | 6/2005 | Dolan |
| 2005/0284644 | A1 | 12/2005 | MacDonald, III et al. |
| 2006/0113094 | A1 | 6/2006 | Silva, Jr. et al. |
| 2007/0039743 | A1 | 2/2007 | MacDonald, III et al. |
| 2007/0095548 | A1 | 5/2007 | MacDonald III et al. |
| 2007/0169946 | A1 | 7/2007 | Cordell et al. |
| 2007/0272319 | A1 | 11/2007 | Bittenbender et al. |
| 2008/0196906 | A1 | 8/2008 | Nusbaum |
| 2008/0277124 | A1 | 11/2008 | Johnston et al. |
| 2010/0038099 | A1 | 2/2010 | Thompson et al. |
| 2012/0031630 | A1 * | 2/2012 | Stephens ................ A62C 3/004 169/17 |
| 2012/0132444 | A1 | 5/2012 | Buzdum et al. |
| 2012/0298382 | A1 | 11/2012 | Shipman |
| 2012/0298383 | A1 | 11/2012 | Shipman |
| 2016/0228734 | A1 | 8/2016 | Shipman |
| 2016/0250507 | A1 | 9/2016 | Shipman |
| 2016/0271432 | A1 | 9/2016 | Shipman |
| 2018/0326238 | A1 | 11/2018 | Polan |

FOREIGN PATENT DOCUMENTS

| | | | |
|---|---|---|---|
| CN | 201356932 | Y | 12/2009 |
| CN | 103826754 | A | 5/2014 |
| DE | 3919638 | C1 | 11/1990 |
| DE | 19914022 | A1 | 9/2000 |
| DE | 102007062668 | A1 | 6/2009 |
| GB | 2123689 | A | 2/1984 |
| JP | 05-137810 | A | 6/1993 |
| JP | 06-170008 | A | 6/1994 |
| JP | 2005027769 | A | 2/2005 |
| JP | 3852056 | B2 | 11/2006 |
| JP | 4872054 | B2 | 12/2011 |
| KR | 200217901 | | 2/2000 |
| KR | 200191235 | | 5/2000 |
| KR | 200285117 | Y1 | 8/2002 |
| KR | 200384965 | Y1 | 5/2005 |
| KR | 20070059890 | A | 6/2007 |
| KR | 101114864 | B1 | 3/2012 |
| KR | 101128257 | B1 | 3/2012 |
| KR | 101130578 | B1 | 4/2012 |
| WO | 01/54772 | A1 | 8/2001 |
| WO | 2012/166636 | A1 | 12/2012 |

OTHER PUBLICATIONS

Communication pursuant to Rules 161(2) and 162 EPC dated Jan. 16, 2015, issued in corresponding European Patent Application No. 12797211.3.

Communication including extended European search report dated Jan. 18, 2016, issued in corresponding European Patent Application No. 12797211.3.

Canadian Official Action dated Feb. 1, 2016, issued in corresponding Canadian Patent Application No. 2,875,122.

Australian Patent Examination Report No. 1 dated Jun. 28, 2016, issued in corresponding Australian Patent Application No. 2013267363.

Australian Notice of Acceptance dated Jul. 5, 2016, issued in corresponding Australian Patent Application No. 2013267363.

(56) References Cited

OTHER PUBLICATIONS

Chinese Official Action dated Jul. 11, 2016, issued in corresponding Chinese Patent Application No. 201380037288.3, with an English translation.
Canadian Official Action dated Jan. 25, 2017, issued in corresponding Canadian Patent Application No. 2,875,122.
Chinese Notification of Intent to Grant dated Feb. 4, 2017, issued in corresponding Chinese Patent Application No. 201380037288.3.
Canadian Notice of Allowance dated Nov. 20, 2017, issued in corresponding Canadian Patent Application No. 2,875,122.
Communication under Rule 71(3) EPC dated Nov. 28, 2017, issued in corresponding European Patent Application No. 12797211.3.
Mexican Official Action dated Jun. 6, 2017, issued in corresponding Mexican Patent Application No. MX/a/2014/014591.
Australian Patent Examination Report No. 2 dated Jun. 15, 2017, issued in corresponding Australian Patent Application No. 2013267363.
United Arab Emirates Search Report, provided by the Korean Intellectual Property Office, dated Jul. 18, 2017, issued in corresponding United Arab Emirates Patent Application No. UAE/P/1321/2014.
Mexican Notice of Allowance dated Aug. 30, 2017, issued in corresponding Mexican Patent Application No. MX/a/2014/014591.
Snijder, A.H. et al., "The glass swing: a vector active structure made of glass struts and 3D-printed steel nodes," Glass Struct. Eng. (2020) vol. 5, pp. 99 to 116, https://doi.org/10.1007/s40940-019-00110-9 (18 pages).

* cited by examiner

FLEXIBLE DRY SPRINKLER

CROSS REFERENCE TO RELATED APPLICATIONS

This application is a continuation of U.S. patent application Ser. No. 17/149,178, filed Jan. 14, 2021, now U.S. Pat. No. 11,596,822, issued Mar. 7, 2023, which is a continuation of U.S. patent application Ser. No. 16/515,600, filed Jul. 18, 2019, now U.S. Pat. No. 10,933,267, issued Mar. 2, 2021, which is a continuation of U.S. patent application Ser. No. 16/044,837, filed Jul. 25, 2018, now U.S. Pat. No. 10,493,307, issued Dec. 3, 2019, which is a continuation of U.S. patent application Ser. No. 14/534,881, filed Nov. 6, 2014, now U.S. Pat. No. 10,265,560, issued Apr. 23, 2019, which is a continuation of U.S. patent application Ser. No. 13/486,904, filed Jun. 1, 2012, now U.S. Pat. No. 8,887,822, issued Nov. 18, 2014, each of which is incorporated herein by reference.

FIELD OF THE INVENTION

My invention relates to a flexible dry fire protection sprinkler. In particular, my invention relates to a flexible dry fire protection sprinkler for use in an area that is exposed to freezing conditions. In addition, my invention relates to a flexible dry fire protection sprinkler that may be adjusted during installation to avoid obstructions.

BACKGROUND OF THE INVENTION

Dry sprinklers are used in areas that are exposed to freezing conditions, such as in freezers or outdoor walkways. In some dry-pipe systems, fluid supply conduits are positioned in a space in which the fluid in the supply conduit is not subject to freezing. A dry sprinkler is attached to the fluid supply conduit and extends into a space in which the fluid would otherwise be subject to freezing.

A typical dry sprinkler comprises a sprinkler head, a tube, a pipe connector at an inlet end of the tube that connects the inlet end to supply conduits, or a pipe network, of the fire suppression system, a plug seal at the inlet end to prevent water from entering the tube until it is necessary to actuate the dry sprinkler, and an actuating mechanism to maintain the plug seal at the inlet end until actuation of the dry sprinkler. Typically, the sprinkler head is attached to an end of the tube that is opposite to the inlet end of the tube. Also, the tube is conventionally vented to the atmosphere to allow drainage of any condensate that may form in the tube.

Examples of dry sprinklers are generally disclosed in U.S. Pat. No. 5,755,431, to Ondracek, and in U.S. Pat. No. 5,967,240, also to Ondracek. As shown generally in these patents, the actuating mechanism of a dry sprinkler can be a rod or other similar structure that extends through the tube between the sprinkler head and the inlet end to maintain the plug seal at the inlet end. The actuating mechanism includes a thermally responsive support element at the sprinkler head that supports the rod and, therefore, the plug seal at the inlet end. In some dry sprinklers, the tube is also sealed at the sprinkler head end of the tube and the actuating mechanism is supported at the sprinkler head end by a seal cap that is supported by the thermally responsive support element. In such arrangements, the space in the tube between the seal cap and the plug seal can be filled with a pressurized gas, such as dry air or nitrogen, or with a liquid, such as an antifreeze solution. When an elevated temperature occurs, the thermally responsive support element fails, releasing the plug seal (and also any lower seal at the sprinkler head end of the tube) to allow water from the fluid supply conduit to flow into and through the tube to the sprinkler head, whereupon the fluid is distributed by the sprinkler head.

Conventional dry sprinklers are fabricated using a rigid tube having a seal at the inlet that is separated from the thermally responsive support element of the sprinkler that is intended to be positioned in an area exposed to freezing conditions, such as an area that is not heated. The rigid tube extends into the unheated area from a wet pipe system (located in a heated area) and must be precisely aligned and installed while avoiding various architectural, structural and mechanical obstructions typically found in commercial or industrial buildings.

SUMMARY OF THE INVENTION

To remedy the problems and difficulties noted above, a dry sprinkler is provided that has a flexible tube. The dry sprinkler includes an inlet having an inlet orifice sealed by an inlet seal assembly, an outlet, and a release mechanism for selectively releasing the inlet seal assembly. A first end of the flexible tube is attached to the inlet. The dry sprinkler also includes a flexible linkage extending longitudinally within the flexible tube, between the inlet and outlet, the flexible linkage constructed to operate the release mechanism in response to axial translation of the flexible linkage. The outlet is attached to the flexible tube, and includes a fire sprinkler portion having a thermally responsive element constructed to support an outlet seal assembly in an unresponsive state. In a case in which the thermally responsive element is in a responsive state, the outlet seal assembly is released, and the flexible linkage translates in an outlet direction at least an inlet stroke distance to activate the release mechanism to release the inlet seal assembly.

DETAILED DESCRIPTION OF THE PREFERRED EMBODIMENTS

Figure 1:
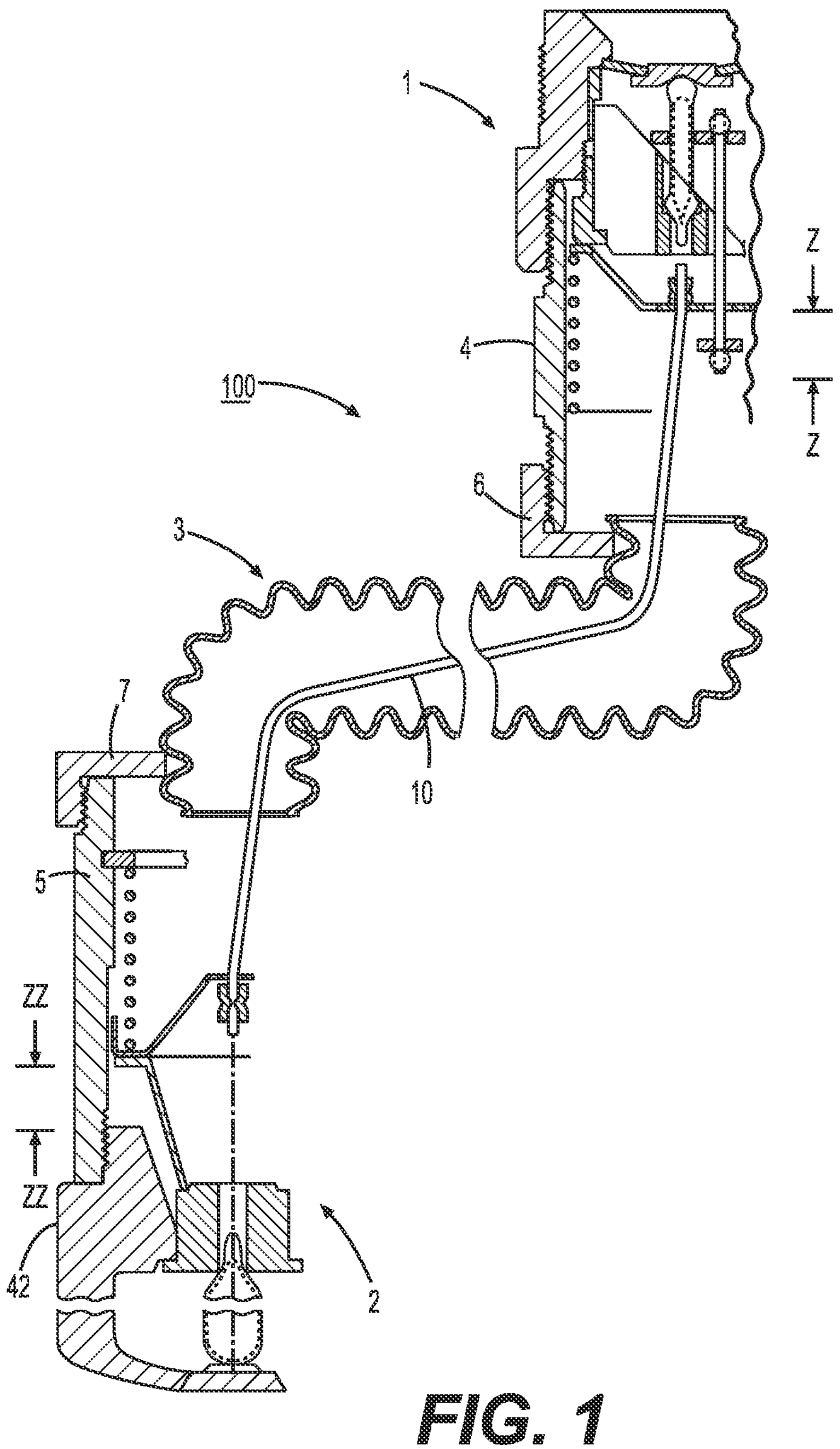
FIG. 1 shows a dry sprinkler in accordance with an embodiment of the invention.

My invention relates to a flexible dry fire protection sprinkler (dry sprinkler). One embodiment of such a dry sprinkler 100 is shown in FIG. 1. The dry sprinkler 100 includes an inlet 1, an outlet 2, and a flexible tube 3. The flexible tube 3 extends between the inlet 1 and the outlet 2 and is in mechanical and fluid communication with the inlet 1 and the outlet 2. The flexible tube 3 also has an inlet end 6 connected to an inlet biasing portion 4 of the inlet 1 by a threaded connection, and an outlet end 7 connected to an outlet biasing portion 5 of the outlet 2 by a threaded connection. A flexible linkage 10 extends through the flexible tube 3 between the inlet 1 and the outlet 2. The flexible linkage 10 is retained at an inlet end and an outlet end by the inlet biasing portion 4 and the outlet biasing portion 5, respectively, as discussed in further detail below.

The following description relates to an embodiment with reference to the appended drawings and refers to directions including “inlet” and “outlet”. As used herein, the phrase “inlet direction” refers to a generally axial direction that is from the outlet 2 and toward the inlet 1 of the dry sprinkler 100, while the phrase “outlet direction” refers to a generally axial direction that is from the inlet 1 toward the outlet 2 of the dry sprinkler 100.

In one embodiment, the flexible tube 3 is formed as a corrugated metal hose constructed similarly to that of a conventional corrugated natural gas appliance hose. The flexible tube 3 has a nominal hose diameter between 0.8 inch and one inch. The flexible tube 3 can be bent into two opposing sections 90, i.e., folded in a shallow Z-shape or a shallow S-shape.

Figure 2:
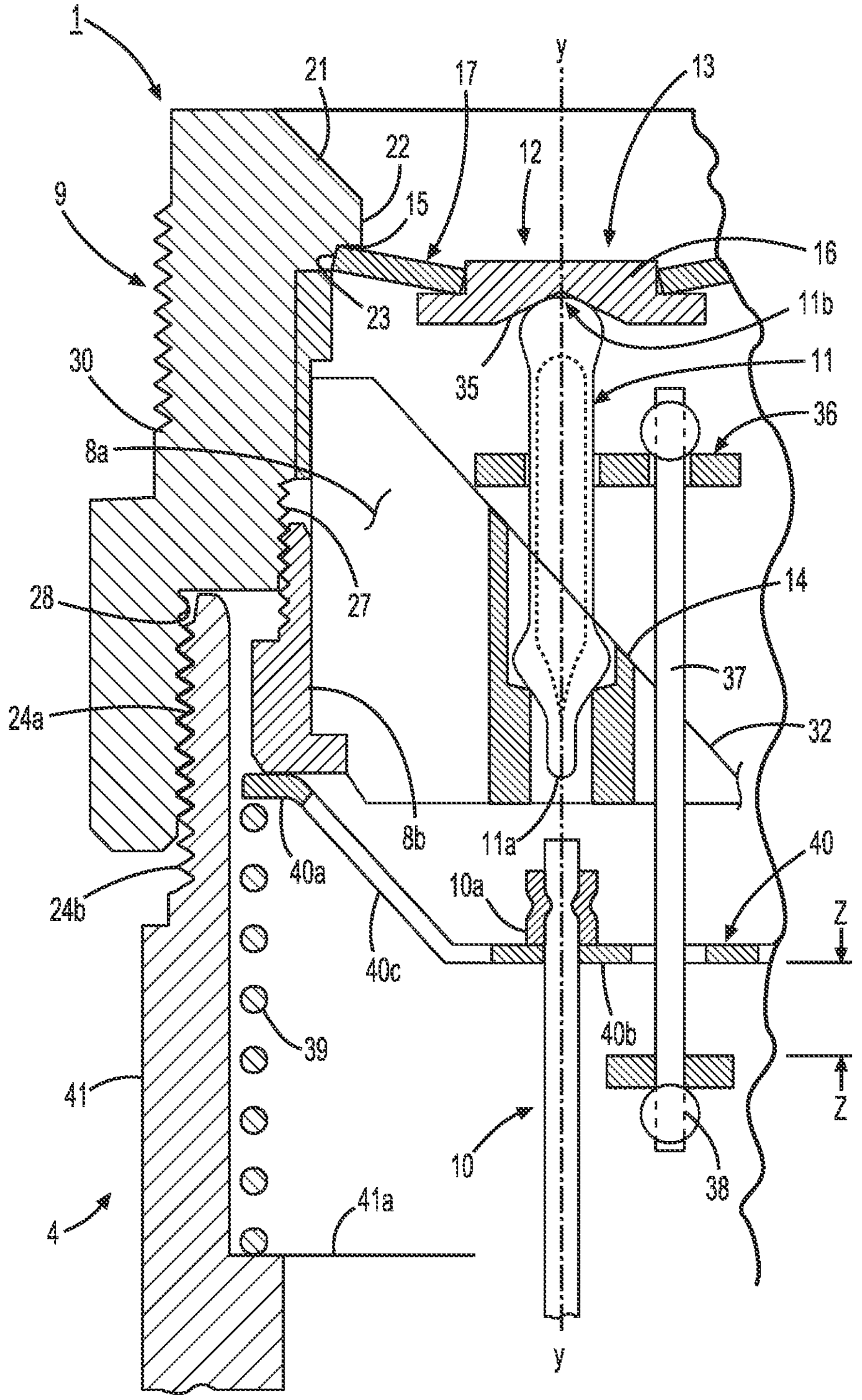
FIG. 2 shows an exploded cutaway section view through an inlet of the dry sprinkler shown in FIG. 1.

As shown in greater detail in FIG. 2, the inlet 1 includes an inlet connection portion 9 and the inlet biasing portion 4. The inlet connection portion 9 includes a fitting 30 having external threads to mate with female threads of a fluid supply to fluidly couple the dry sprinkler 100 to a source of a pressurized fluid, such as water. The fitting 30 has internal threads 24*a* at an outlet end for mating with external threads 24*b* of the inlet biasing portion 4.

The internal surface of the fitting 30 has a stepped cross-sectional profile. Beginning at an inlet end, the fitting 30 has a frustoconical surface 21 that tapers radially inward toward an inlet orifice 12. In one embodiment, the angle of the frustoconical surface 21 with respect to the axis Y-Y is about forty degrees. Adjacent to the frustoconical surface 21 in the outlet direction is a first cylindrical surface 22 that surrounds the inlet orifice 12. Adjacent to the first cylindrical surface 22 is a second cylindrical surface 23 and a cap assembly sealing flange 15. The second cylindrical surface 23 has a diameter that is at least as large as the diameter of an annular spring washer 17, described below, when the spring washer 17 is in a compressed state. The second cylindrical surface 23 extends to a yoke connection section 27 that has internal threads for mating with external threads of a threaded yoke support ring 8*b*. The internal threads of the yoke connection section 27 extend about 0.3 inch axially and the nominal diameter of the threads is one inch.

Adjacent to the yoke connection section 27 in the outlet direction is a first biasing portion connection section 28 that has a diameter that is larger than that of the yoke connection section 27. The first biasing portion connection section 28 extends axially about 0.5 inch to the outlet end of the inlet connection portion 9. The first biasing portion connection section 28 has internal threads for mating with external threads of the first biasing portion 4 of the inlet 1.

Figure 3:
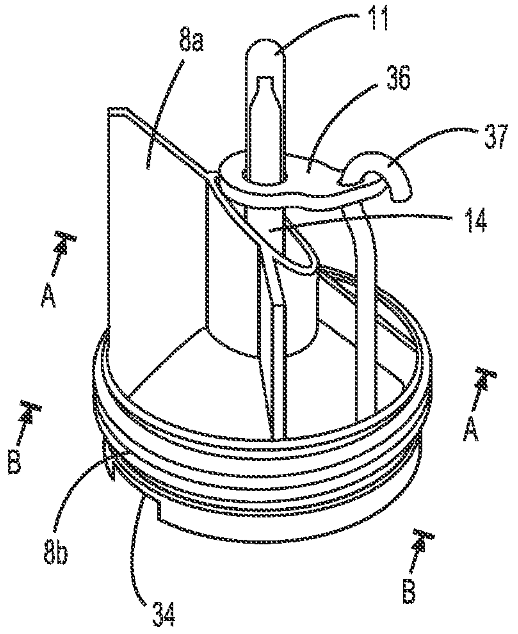
FIG. 3 shows an isometric view of a yoke, an O-collar, a linkage, and a glass bulb that are disposed in the inlet shown in FIGS. 1 and 2, viewed from the top and side of the yoke.

As shown in FIG. 3, a notch 34 is formed at the outlet end of the yoke support ring 8*b*. The notch 34 is constructed to receive a tool or other device to apply torque to the yoke support ring 8*b*, so that the fitting 30 and the yoke support ring 8*b* can be threaded onto each other to apply compression to a glass bulb 11.

With reference to FIG. 2, when the dry sprinkler 100 is in an inactive state, the inlet orifice 12 is sealed by an inlet sealing cap assembly 13. The inlet sealing cap assembly 13 includes an inlet sealing cap 16 and the annular spring washer 17, such as a Belleville spring washer. In the inactivated state of the dry sprinkler 100, the annular spring washer 17 is sealed between the inlet sealing cap 16 and the cap assembly sealing flange 15 of the inlet fitting 30. The arrangement and operation of the inlet sealing cap assembly 13 will be described in greater detail herein below.

In the inactive state of the dry sprinkler 100, the inlet sealing cap 16 supports the annular spring washer 17 against the fitting 30. The inlet sealing cap assembly 13 is supported in a sealed position by the glass bulb 11 that is interposed between the inlet sealing cap assembly 13 and a multi-legged yoke 8*a* that is supported by the fitting 30 via the yoke support ring 8*b* threadably connected to the fitting 30.

The glass bulb 11 can be empty or filled with a thermally responsive fluid, and, in one embodiment, the glass bulb 11 has a nominal length of twenty mm. The glass bulb 11 is oriented substantially longitudinally and coaxially with the fitting 30 and the inlet biasing portion 4. The glass bulb 11 has an outlet pipe end 11*a* that is seated in a seat 14 formed in the multi-legged yoke 8*a*. At an inlet end, the glass bulb 11 has a rounded end 11*b*, also referred to as the “pivot point”. The inlet sealing cap assembly 13 has a conical groove 35 formed in the center of the inlet sealing cap 16 in which the pivot point 11*b* of the glass bulb 11 is seated.

When the dry sprinkler 100 is in the inactive state, the annular spring washer 17 is compressed against the cap assembly sealing flange 15 by threading the yoke support ring 8*b* into the fitting 30, thereby sealing the flow path of fluid through the inlet orifice 12. The annular spring washer 17 is compressed by the glass bulb 11 to a sufficient deflection capable of surviving a hydrostatic test pressure between six hundred pounds per square inch and seven hundred pounds per square inch. Thus, it is possible to assemble the fitting 30, the inlet sealing cap assembly 13, the multi-legged yoke 8*a*, the yoke support ring 8*b*, and the glass bulb 11 together as a modular assembly comprising the inlet connection portion 9 of the inlet 1.

Figure 5:
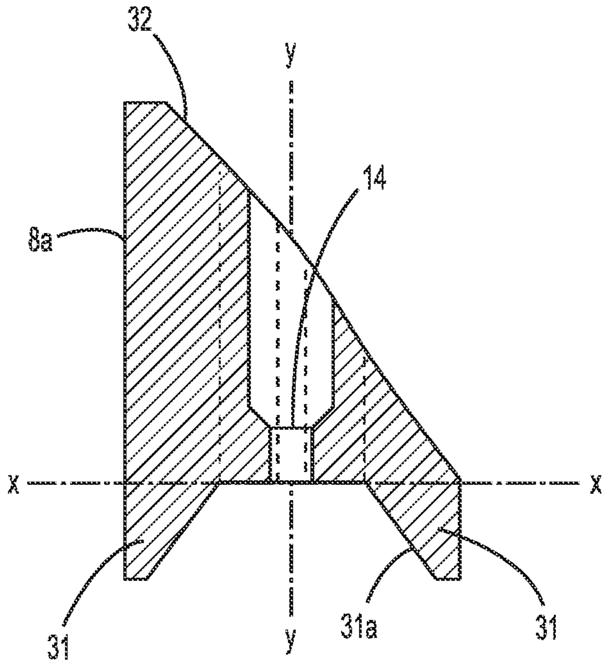
FIG. 5 shows a cross-sectional view of the yoke along section A-A in FIG. 3.

The multi-legged yoke 8*a* is supported by yoke support ring 8*b* that is threaded into and retained by an inner wall of the fitting 30. FIG. 5 shows a view along section A-A in FIG. 3, and shows the multi-legged yoke 8*a* in greater detail. At an outlet end, the multi-legged yoke 8*a* has a plurality of circumferentially spaced legs 31, also referred to as “flutes”. The flutes 31 are circumferentially spaced to permit the flow of fluid past the multi-legged yoke 8*a* and to minimize the restriction of fluid flow. The flutes 31 are also circumferentially spaced to capture the sealing cap assembly 13 upon release thereof, as described further below. As shown in FIG. 5, a radially inner edge 31*a* of each flute 31 is angled by about fifty degrees with respect to the axis Y-Y. Each flute 31 extends in the axial direction between 0.180 inch and 0.260 inch.

At an inlet end, the multi-legged yoke 8*a* has an angled edge 32 that is angled with respect to the axis Y-Y and a horizontal axis X-X. In one embodiment, the angled edge 32 is angled by about forty degrees with respect to the horizontal axis X-X. The seat 14 for the glass bulb 11 is coaxial with the multi-legged yoke 8*a*, and is intersected by the angled edge 32. The diameter of the multi-legged yoke 8*a* is about 0.934 inch and the diameter of the seat 14 is about 0.156 inch. The overall axial dimension of the multi-legged yoke 8*a* is about one inch.

Figure 6:
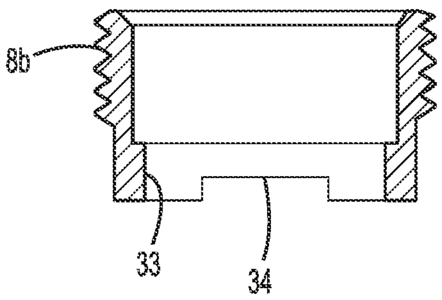
FIG. 6 shows a cross-sectional view of a yoke retaining ring along section B-B in FIG. 3.

FIG. 6 shows a detailed cross-sectional view of the yoke support ring 8*b* along section B-B in FIG. 3. The yoke support ring 8*b* has an overall axial dimension of about 0.370 inch and an outer diameter of 1.060 inch. The yoke support ring 8*b* has an annular flange 33 that supports the multi-legged yoke 8*a*. The notch 34 is formed on the output end of the yoke support ring 8*b*, and facilitates use of a tool to thread the yoke support ring 8*b* with respect to the fitting 30 so as to compress the glass bulb 11 between the multi-legged yoke 8*a* and the inlet seal assembly 13.

Figure 4:
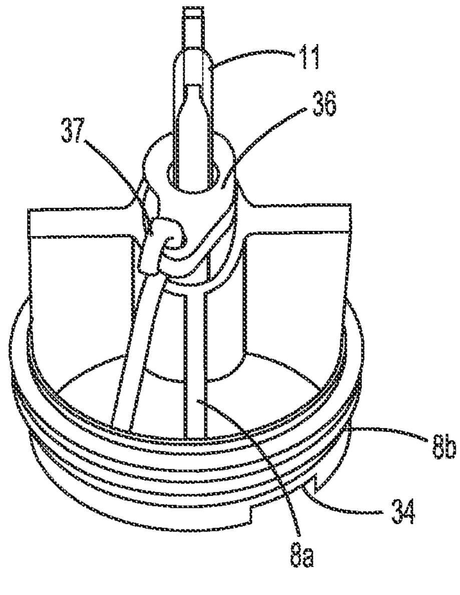
FIG. 4 shows an isometric view of the yoke, the O-collar, the linkage, and the glass bulb, shown in FIG. 3, viewed from the top and another side of the yoke.

Referring again to FIGS. 2, 3, and 4, a sliding, O-shaped collar 36 surrounds the glass bulb 11 between the angled edge 32 of the multi-legged yoke 8*a* and the inlet seal cap assembly 13. The collar 36 is connected to a collar rod 37 that extends axially in the outlet direction a predetermined distance, beyond the flutes 31 of the multi-legged yoke 8*a*. With reference to FIG. 2, at an outlet end, the collar rod 37 is terminated by a physical stop 38 that is constructed to interfere with the inlet biasing portion 4 during sprinkler activation. The collar rod 37 is constructed to transfer a force to the collar 36 prior to sprinkler activation in order to break the glass bulb 11 so that the inlet seal cap assembly 13 can be released, as discussed below.

As shown in FIG. 2, the inlet biasing portion 4 of the inlet 1 includes a first threaded tube 41 that houses an inlet compression spring 39, and a first spacer 40. The first threaded tube 41 has external threads at an inlet end that mate with internal threads of fitting 30. The first threaded tube 41 also has external threads that mate with the internal threads 24*a* of the inlet end 6 of flexible tube 3.

The first spacer 40 has an outer annular flange 40*a* and an inner annular flange 40*b* that are axially spaced from each other by a frustoconical web 40*c*. The inlet compression spring 39 is retained between an annular flange 41*a* proximate the outlet end of the first threaded tube 41 and the outer annular flange 40*a* of the first spacer 40. The first spacer 40 is biased axially by the inlet compression spring 39 towards the yoke support ring 8*b*. The frustoconical web 40*c* has openings to permit fluid to pass therethrough. The inner annular flange 40*b* includes an opening though which the collar rod 37 passes.

The optimum spring force is established when the first threaded tube 41 is fully threaded into the fitting 30 to set a desired distance between the inner annular flange 40*b* of the first spacer 40 and the stop 38 of the collar rod 37. The desired distance "Z" set is termed the "inlet stroke", and, in one embodiment, is set to be greater than the axial deflection of the end of the flexible linkage 10 when the flexible tube 3 and the flexible linkage 10 are bent into two opposing ninety degrees, i.e., folded in a shallow Z-shape or a shallow S-shape. In one embodiment, the inlet stroke Z is approximately 0.60 inch.

The flexible linkage 10 can be formed of wire or cable, such as braided stainless steel cable. In the preferred embodiment, the flexible linkage 10 is formed of a 0.125 inch diameter braided stainless steel cable. Collars 10*a* (FIG. 2) and 10*b* (FIG. 7) are attached, respectively, at the inlet and outlet ends of the flexible linkage 10, by, for example, crimping. The collar 10*a* interferes with the inner annular flange 40*b* of the first spacer 40. In the preferred embodiment, the inlet end of the flexible linkage 10 extends axially through the center of the inner annular flange 40*b* and is thus radially spaced from the inner wall of the first threaded tube 41 of the inlet biasing portion 4.

Referring again to FIG. 1, the flexible linkage 10 extends axially from the inlet biasing portion 4 through the flexible tube 3 to the outlet biasing portion 5 of the outlet 2. The outlet 2 includes the outlet biasing portion 5 and a sprinkler portion 42, and the outlet biasing portion 5 and the sprinkler portion 42 are connected together by, for example, a threaded connection.

Figure 7:
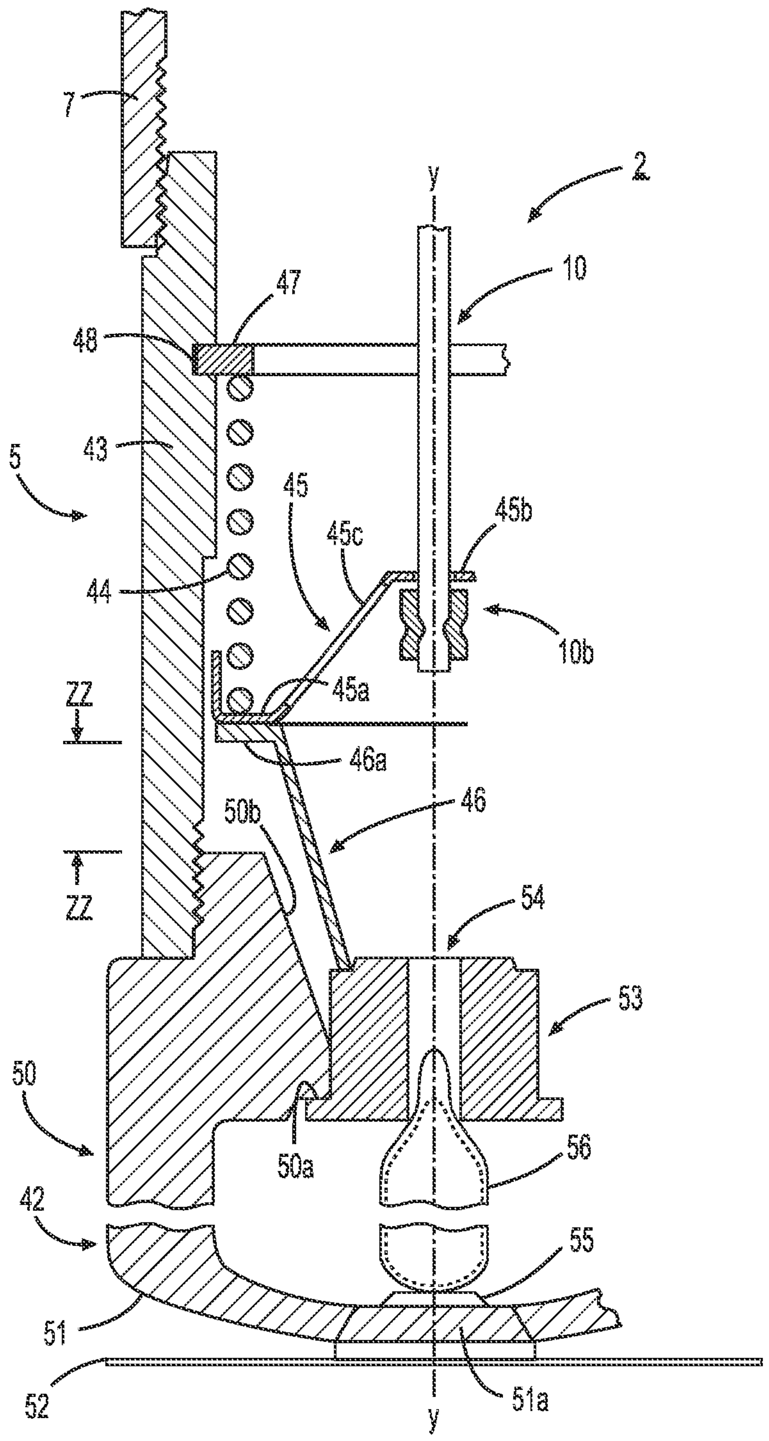
FIG. 7 shows an exploded cutaway cross-sectional view through an outlet of the dry sprinkler shown in FIG. 1.

As shown in greater detail in FIG. 7, the outlet biasing portion 5 includes a second threaded tube 43 that houses an outlet compression spring 44, a second spacer 45 in contact with the outlet compression spring 44, and an orifice venturi 46 in contact with the second spacer 45. The second spacer 45 is constructed similarly to the first spacer 40. For example, the second spacer 45 has an inner annular flange 45*b* that is connected to an outer annular flange 45*a* by a frustoconical web 45*c* that includes at least one opening to permit fluid to pass through the web 45*c*. The outlet end of the flexible linkage 10 passes through a central opening in the inner annular flange 45*b* of the second spacer 45. The outlet compression spring 44 biases the inner annular flange 45*b* to contact the collar 10*b* attached to the flexible linkage 10.

In one embodiment, the outlet compression spring 44 is retained between an annular retaining ring 47 and the outer annular flange 45*a* of the second spacer 45. The retaining ring 47 is retained in a notch 48 formed in an inner wall of the second threaded tube 43. In another embodiment, the outlet compression spring 44 is retained by an annular flange similar to the annular flange 41*a* of first threaded tube 41, shown in FIG. 2. The outlet compression spring 44 biases the second spacer 45 in the outlet direction and causes the second spacer 45 to come into contact with an outer flange 46*a* of the orifice venturi 46. The orifice venturi 46 is supported by the sprinkler portion 42 of the outlet 2.

The sprinkler portion 42 of the outlet 2 is a conventional fire sprinkler and includes a threaded sprinkler body 50 constructed to mate with threads of the outlet of the second threaded tube 43 of the outlet biasing portion 5, a frame 51 extending from the sprinkler body 50 in the output direction, and a deflector 52 supported by a hub 51 of the frame 51. The deflector 52 distributes fluid that passes through the orifice venturi 46 and through the outlet 2. The sprinkler body 50 retains an orifice plug 53 that communicates with an outlet orifice 54 in an outlet end of the orifice venturi 46. The orifice plug 53 is retained in a seated position in an annular flange 50*a* of the sprinkler body 50, as shown in FIG. 7, by a thermally responsive element 56, such as, for example, a glass bulb that is filled with a thermally responsive fluid. In one embodiment, a glass bulb 56 having a nominal length of twenty mm is used as the thermally responsive element 56. A set screw 55 in the hub 51*a* of the frame 51 compresses the glass bulb 56 against the orifice plug 53 to seat (i.e., compress) the plug 53 in the annular flange 50*a*. It will be appreciated by those of ordinary skill in the art that the particular details and configuration of the sprinkler portion 42 of the outlet 2 depend on the fire protection application and installation requirements of the dry sprinkler 100. For example, the frame 51 and the deflector 52 used will be different depending on whether the dry sprinkler 100 is a pendent sprinkler or a horizontal sidewall sprinkler. Thus, it should be understood that other suitable deflector arrangements may be substituted for the sprinkler portion 42 shown in FIG. 7.

When the dry sprinkler 100 is assembled, the orifice venturi 46 exerts a biasing force against the orifice plug 53. A distance "ZZ" between the outer flange 46*a* of the orifice venturi 46 and the inlet end of the body 50 of the sprinkler portion 42 is termed the "outlet stroke" ZZ, and is set by threading the body 50 with the second threaded tube 43 of the outlet biasing portion 5. In one embodiment, the outlet stroke ZZ is set to be about 0.80 inch and the inlet stroke Z is set, as discussed above, to be about 0.60 inch.

The second threaded tube 43 has external threads at an inlet end for mating with internal threads of the flexible tube 3. The second threaded tube 43 also has internal threads for mating with the external threads of the sprinkler portion 42.

The outlet 2 can be pre-assembled and attached as one modular unit to the outlet end 7 of the flexible tube 3.

When the flexible tube 3 bends, the flexible linkage 10 within the flexible tube 3 will deflect. Due to internal diametrical and radial clearances of the flexible tube 3, however, when the flexible tube 3 is bent from a straight configuration, for example, in which the inlet stroke Z and outlet stroke ZZ distance are set, and in which the inlet 1, the outlet 2, and the flexible tube 3 are substantially in axial alignment, the ends of the flexible linkage 10 within the flexible tube 3 will change positions relative to the ends of the flexible tube 3. For example, the ends of the flexible linkage 10 will move longitudinally inward from the ends of the flexible tube 3 as the angular deflection of the flexible tube 3 increases. For example, if a flexible tube 3 having a length of twenty inches and a flexible linkage 10 having approximately the same length are bent into two opposing ninety degrees, i.e., folded into a shallow Z-shape or a shallow S-shape, the length of the flexible linkage 10 and the flexible tube 3 remain the same, but the ends of the flexible linkage 10 shift further inwardly by approximately 0.5 inch relative to the ends of the flexible tube 3. By virtue of the foregoing arrangement of the dry sprinkler 100, each of the inlet compression spring 39 and the outlet compression spring 44 will tolerate changes in the relative movement between the flexible linkage 10 and the flexible tube 3 without affecting the tautness of the flexible linkage 10 due to field induced bending of the flexible tube 3. Accordingly, the inlet stroke Z is set to be sufficiently large to avoid fracture of the glass bulb 11 due to bending of the flexible tube 3.

The outlet compression spring 44 is constructed to be at least 1.5 times stronger than the opposing inlet compression spring 39 so that, as the flexible tube 3 is bent at a larger angle, the deflection of the ends of the flexible linkage 10 is compensated for by the inlet compression spring 39 and not by the outlet compression spring 44.

In operation, in the event of a fire condition, heat from the fire will cause the thermally responsive element 56 (i.e., the glass bulb 56) of the sprinkler portion 42 to break. In the case in which the thermally responsive element 56 is a glass bulb filled with a thermally responsive fluid, as shown in FIG. 7, when an ambient temperature reaches a predetermined limit associated with the glass bulb 56, the glass bulb 56 will rupture. When the glass bulb 56 ruptures, the orifice plug 53 is no longer compressed, and the force exerted by the outlet compression spring 44 on the orifice venturi 46 will urge the orifice plug 53 in the outlet direction, ejecting the orifice plug 53 out of the outlet orifice 54. The force exerted on the orifice venturi 46 by the outlet compression spring 44 forces the second spacer 45 and the flexible linkage 10 to move from a first, inactivated position, by a distance of at least the outlet stroke distance, into a second, activated position, in which the orifice venturi 46 slides axially in the outlet direction until it is wedged into a frustoconical surface 50*b* formed in the sprinkler body 50 of the sprinkler portion 42.

As the second spacer 45 moves to the second position, it pulls on the crimp 10*b* that, in turn, pulls on the first spacer 40. The first spacer 40 then compresses the inlet compression spring 39, and as the first spacer 40 continues to translate axially in the output direction, the first spacer 40 pulls on the collar rod 37. When the collar rod 37 is pulled by the first spacer 40, the collar rod 37 pulls on the collar 36 in a direction down and along the angled edge 32 of the multi-legged yoke 8*a* and causes the collar 36 to snap into the glass bulb 11, thereby breaking the glass bulb 11.

When the glass bulb 11 breaks, axial support for the inlet sealing cap assembly 13 is removed. Water pressure on the inlet side of the inlet sealing cap assembly 13 unseats the inlet sealing cap assembly 13 and initiates fluid flow through the inlet orifice 12. In one embodiment, the collar rod 37 is constructed to engage the first spacer 40 when the first spacer 40 is displaced axially the inlet stroke distance Z of 0.60 inch and the second spacer 45 is displaced axially the outlet stroke distance ZZ of 0.80 inch. The 0.20 inch difference between the inlet stroke distance Z and the outlet stroke distance ZZ represents a safety margin over the 0.60 inch shift that the taut flexible linkage 10 would experience merely by being bent during field installation. As a result of this arrangement, the glass bulb 11 seated in the multi-legged yoke 8*a* will not break, and the inlet seal cap assembly 13 will not be unseated, unless the second spacer 45 is displaced the outlet stroke distance ZZ that is greater than the inlet stroke distance Z. Thus, inadvertent activation of the dry sprinkler 100 due to substantially large flexing of the flexible tube 3 can be avoided.

When the sprinkler 100 is activated, the inlet seal cap assembly 13 moves axially in the output direction, pivots on the pivot point 11*b*, slides down the angled edge 32 of the multi-legged yoke 8*a*, and is retained by the flutes 31 of the multi-legged yoke 8*a*. Fluid from the sprinkler system flows through the inlet orifice 12, around the retained inlet seal cap assembly 13, through the interior of the flexible tube 3, and out the outlet orifice 54 of the outlet 2 to the deflector 52 that distributes the fluid from the dry sprinkler 100.

While a dry sprinkler incorporating various combinations of the foregoing features provides the desired fast operation with full rated flow under at least some operating conditions, adopting the above-described features in combination results in a dry sprinkler that provides the desired fast operation with full rated flow under a very wide range of rated flows (commonly expressed in the art in terms of the K-factor) and across a variety of fluid pressures in the fluid supply conduit, i.e., from 7 psi to 175 psi.

The invention also relates to a fire protection system utilizing one or more such dry sprinklers. The fire protection system includes a fluid supply in communication with at least one dry sprinkler. At least one of the dry sprinklers of the fire protection system is constructed as a flexible dry sprinkler in accordance with the foregoing description.

The attached drawings should be understood as being not to scale. Those drawings illustrate portions of embodiments of a dry sprinkler according to the present invention, and form part of the present application.

By virtue of the flexibility in the flexible tube 3 of the dry sprinkler 100, installation of the sprinkler system, and, in particular, of the dry sprinkler 100, is facilitated because the dry sprinkler 100 can be moved around building obstructions that would ordinarily require additional rigid plumbing. Moreover, by virtue of the flexibility of the flexible tube 3, installers of the fluid supply can more easily accommodate variability or errors in the location of sprinkler drops in the ceiling of structures, since the flexible tube 3 can be bent to move the sprinkler portion 42 of the dry sprinkler 100 to a desired position.

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

INDUSTRIAL APPLICABILITY

My invention can be used to provide fire protection, particularly in areas subject to freezing conditions. Thus, the invention is applicable to the fire protection industry.

I claim:

1. A flexible dry sprinkler comprising:
an inlet comprising an inlet orifice;
an outlet;
a flexible tube having a first end attached to the inlet and a second end attached to the outlet;
an inlet seal for sealing the inlet orifice, wherein, when the inlet seal releases, in an activated state of the flexible dry sprinkler, fluid is permitted to flow from the inlet orifice to the outlet through the flexible tube; and
a static yoke positioned in the inlet, the static yoke comprising a plurality of spaced-apart legs that extend substantially in an axial direction and permit the fluid to flow past the yoke toward the outlet.

2. The flexible dry sprinkler of claim 1, the inlet further comprising a fitting for connecting the flexible dry sprinkler to a supply of pressurized fluid.

3. The flexible dry sprinkler of claim 1, wherein the legs are oriented at an angle to a central axis of the static yoke.

4. The flexible dry sprinkler of claim 1, the static yoke further comprising a support ring connecting the spaced-apart legs.

5. The flexible dry sprinkler of claim 4, further comprising a strut having a first end and a second end, the first end of the strut being supported by the yoke and the second end of the strut pressing against the inlet seal to seal the inlet orifice.

6. The flexible dry sprinkler of claim 5, the strut being oriented substantially longitudinally.

7. The flexible dry sprinkler of claim 5, the strut being oriented coaxially with the static yoke.

8. The flexible dry sprinkler of claim 5, the inlet seal comprising a sealing cap and a spring washer, whereby the strut presses against the sealing cap, which, in turn, presses against the spring washer to seal the inlet orifice.

9. The flexible dry sprinkler of claim 8, wherein the sealing cap has a groove against which the strut presses.

10. The flexible dry sprinkler of claim 5, the inlet further comprising a fitting for connecting the flexible dry sprinkler to a supply of pressurized fluid, the strut being oriented coaxially with the fitting.

11. The flexible dry sprinkler of claim 5, the support ring having external threads and the inlet having internal threads, whereby threading the support ring into the inlet causes the static yoke to apply pressure to the strut.

12. A flexible dry sprinkler comprising:
an inlet comprising an inlet orifice;
an outlet;
a flexible tube having a first end attached to the inlet and a second end attached to the outlet;
an inlet seal for sealing the inlet orifice, wherein, when the inlet seal releases into the inlet, in an activated state of the flexible dry sprinkler, fluid is permitted to flow from the inlet orifice to the outlet through the flexible tube; and
a trap, having a plurality of openings and positioned across the inlet, for capturing the inlet seal upon release of the inlet seal, while permitting the fluid to flow into the flexible tube.

13. The flexible dry sprinkler of claim 12, the inlet seal comprising a sealing cap and a spring washer.

14. A flexible dry sprinkler comprising:
an inlet having an inlet orifice and an inlet seal;
an outlet;
a flexible tube having a first end attached to the inlet and a second end attached to the outlet;
a strut positioned axially within the inlet, the strut pressing against the inlet seal to seal the inlet orifice; and
a horizontally-positioned bar coupled to the strut and pressing against the inlet seal, whereby, when the bar is caused to move, in an activated state of the flexible dry sprinkler, pressure from the strut against the inlet seal is removed, thereby releasing the inlet seal and permitting fluid to flow from the inlet orifice to the outlet through the flexible tube.

15. A flexible dry sprinkler according to claim 14, further comprising a flexible linkage extending between the inlet and the outlet through the flexible tube, the flexible linkage operatively coupled to the bar.

16. A flexible dry sprinkler according to claim 15, wherein the outlet comprises a thermally responsive element, whereby, when the thermally responsive element is in a responsive state, the flexible linkage translates toward the outlet from a first position to a second position.

17. A flexible dry sprinkler according to claim 16, the outlet further comprising an outlet seal that releases when the thermally responsive element is in the responsive state, permitting the fluid to flow out to the outlet.

18. A flexible dry sprinkler according to claim 16, the bar being caused to move when the flexible linkage axially translates toward the outlet from the first position to the second position.

19. A flexible dry sprinkler according to claim 15, wherein the bar has an opening operatively coupled to an inlet end of the flexible linkage.

20. A flexible dry sprinkler according to claim 19, wherein, when the flexible linkage axially translates toward the outlet from the first position to the second position, the flexible linkage pulls the bar downwards toward the outlet.

* * * * *